Patented Mar. 18, 1924.

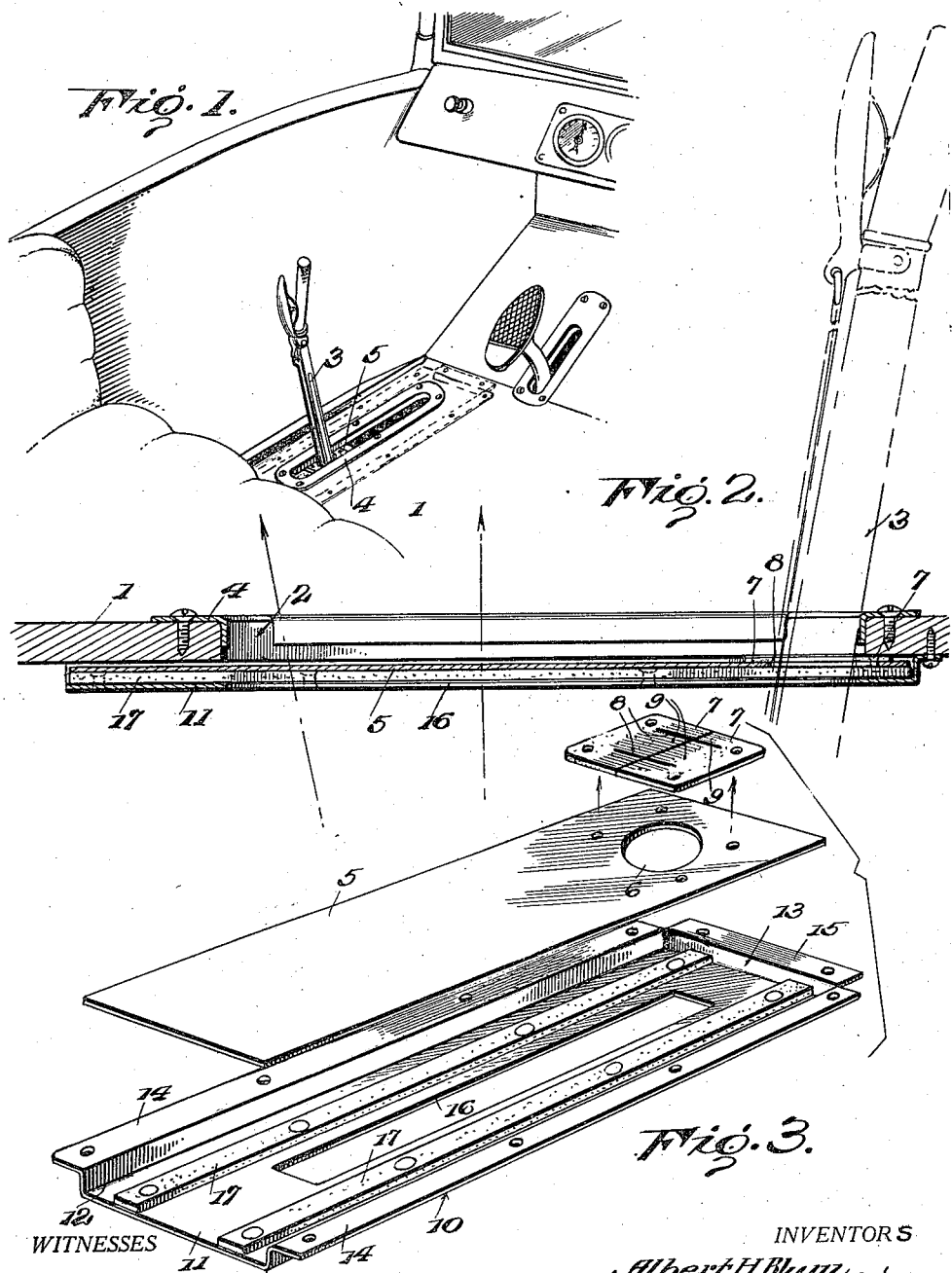

1,487,009

UNITED STATES PATENT OFFICE.

ALBERT HAROLD BLUM AND DANIEL TIMOTHY SHANAHAN, OF GREENVILLE, MISSISSIPPI.

DUSTGUARD CASE FOR AUTOMOBILES.

Application filed June 7, 1923. Serial No. 644,000.

*To all whom it may concern:*

Be it known that we, ALBERT HAROLD BLUM and DANIEL TIMOTHY SHANAHAN, citizens of the United States, and residents of Greenville, in the county of Washington and State of Mississippi, have invented certain new and useful Improvements in Dustguard Cases for Automobiles, of which the following is a specification.

This invention relates to guards for openings in the floor boards of an automobile and through which the operating levers or pedals extend.

An object of the invention is the provision of a guard adapted to be associated with the emergency brake lever of a Ford automobile for closing the slot in the floor board through which the lever operates for the purpose of preventing air, water and dust passing through said slot when said lever is in its normal inoperative position.

A further object of the invention is the provision of a guard providing a closure for a slot in the floor board of an automobile through which the emergency brake operates and which is operated simultaneously with said lever, said guard being provided with means for aiding in sealing the opening to prevent air, water and dust passing through the slot.

Other objects and advantages will become apparent during the course of the following description.

The invention is illustrated by way of example in the accompanying drawing, in which, Figure 1 is a fragmentary view in perspective of the forward portion of an automobile floor disclosing our invention applied to the emergency brake lever of the automobile.

Figure 2 is a longitudinal section of the guard applied to the slot through which the emergency brake operates.

Figure 3 is a view in perspective of the guard and its associated parts in disengaged relation.

Referring more particularly to the drawings, 1 designates the floor located in front of the front seat of a Ford automobile and is provided with an opening or slot 2 through which projects an emergency brake lever 3. The periphery of the slot is reinforced by a metal band 4.

When the automobile is running the emergency brake lever is located at the forward end of the slot and dust, moisture and air are forced upwardly through the slot into the body of the automobile during running. In order to close this opening during running of the automobile, we have provided a guard 5 composed of sheet metal preferably rectangular in shape and provided with an opening 6 at one end of sufficient size through which is inserted the emergency brake lever 3.

In order to prevent dust and air travelling through the opening 6 and along the lever 3 we have secured to the upper face of the guard 5 and adjacent the opening 6 a pair of leather guards 7 which have their inner ends in engagement with each other. The members 7 are provided with openings alining with openings in the plate 5 whereby said members may be secured to the upper face of said plate. The members 7 are provided with slits 8 which extend transversely of the meeting edges of said member to provide tongues 9. These tongues are adapted to be forced upwardly and embrace the sides of the emergency brake lever and aid in sealing the opening where the emergency brake lever passes through the guard 5.

A track or guideway 10 is provided in which the guard 5 slides when the lever 3 is operated. This guide is formed of a thin sheet of metal stamped to form a channel member and comprises a base member 11, vertical side flanges 12 and a vertical end flange 13. Extending at right angles to the flanges 12 are horizontal flanges 14 which are perforated to receive securing means for locking the guide to the bottom of the floor boards. The end vertical flange 13 is provided with a horizontal flange 15 which is likewise provided with perforations to receive securing means for locking the end of the guide to the floor board.

A longitudinal slot 16 is formed centrally and longitudinally of the bottom plate 11 and is adapted to register with the opening 2 in the floor boards and through which the emergency brake lever operates.

Secured longitudinally of the base 11 and upon opposite sides of the slot 16 are a pair of leather tracks 17 forming rails upon which the guard 5 rides during operation of the lever 3. The tracks 17 may be formed of any material suitable for the purpose and which will provide a seal for aiding in preventing dust, moisture and air from passing upwardly through the slot and into the space located forwardly of the front seat in the automobile body.

When the guide 10 is secured to the under face of the floor boards, the guard 5 slides between the floor boards and the track 17. When the emergency brake lever is located forwardly and in an inoperative position to permit driving of the automobile, the guard 5 will completely close the opening 2 in the floor board.

When the emergency brake lever is located in the position shown in Figure 1 the opening will be exposed to view or when the lever is located in neutral position part of the opening will be exposed to view, but since the automobile is either standing still or moving very slowly at this time the partial opening of the slot in the floor boards will have no effect in permitting a draft of air to pass through the slot.

It must be borne in mind that the object of the device is accomplished when the emergency brake lever is moved to its forward position and the automobile is running.

What we claim is:

1. In a device of the class described, the combination of a floor board of an automobile provided with a slot, a lever operable in said slot, a guard comprising a plate provided with an opening to receive the lever, means mounted on the plate adjacent the opening engageable with the lever for sealing the opening in the plate, and a guide secured to the floor board to receive the plate and guide it in its oscillating movement.

2. In a device of the class described, the combination of a floor board of an automobile provided with a slot, a lever operable in said slot, a guard comprising a plate provided with an opening to receive the lever, means mounted on the plate adjacent the opening engageable with the lever for sealing the opening in the plate, a channel-shaped member providing a guide for the movable guard and provided with a slot in which the lever is adapted to oscillate, tracks located upon opposite sides of the slot adapted to support the plate and aid in sealing the opening in the floor board.

3. In a device of the class described, the combination of a floor board of an automobile provided with a slot, a lever operable in said slot, a guard comprising a plate provided with an opening to receive the lever, means mounted on the plate adjacent the opening engageable with the lever for sealing the opening in the plate, a channel-shaped member providing a guide for the movable guard and provided with a slot in which the lever is adapted to oscillate, tracks located upon opposite sides of the slot adapted to support the plate and aid in sealing the opening in the floor board, said channel-shaped member being provided with laterally extending flanges, means for securing the flanges to the under face of the floor boards whereby the guard is slidable between the under face of the floor boards and the tracks.

4. In a device of the class described, the combination of a floor board of an automobile provided with a slot, a lever operable in said slot, a plate provided with an opening through which the lever is adapted to be oscillated, said plate being provided with flanges at its opposite edges extending upwardly and laterally from the same, and flanges extending upwardly and outwardly from the one end of the plate, tracks secured to the plate adjacent the longitudinal side edges of the slot, a guard slidable on the tracks of the plate and having its side edges in engagement with the upstanding flanges disposed along the edge of the plate, said guard being provided with an opening to receive the lever whereby when the said lever is oscillated the guard is carried with the reciprocating lever, means for securing the lateral flanges of the plate to the floor board of the automobile, a flat flexible member secured to the guard above the opening and provided with slits forming lips adapted to snugly engage the lever when said lever is inserted through the flexible member for sealing the opening in the guard where said lever passes through the opening.

ALBERT HAROLD BLUM.
DANIEL TIMOTHY SHANAHAN.